United States Patent [19]

Brammer, Sr. et al.

[11] Patent Number: 4,976,455
[45] Date of Patent: Dec. 11, 1990

[54] HANDRAIL

[75] Inventors: Robert C. Brammer, Sr.; Robert C. Brammer, Jr., both of Traverse City, Mich.

[73] Assignee: Stromberg-Carlson Products, Inc., Traverse City, Mich.

[21] Appl. No.: 274,399

[22] Filed: Nov. 21, 1988

[51] Int. Cl.$^5$ ............................................. B60R 27/00
[52] U.S. Cl. ..................... 280/762; 16/319; 16/344; 248/289.1; 280/164.1; 403/93; 403/94
[58] Field of Search ...................... 280/163, 164.1, 166, 280/762; 296/162; 248/289.1; 403/93, 94, 96; 182/106, 113; 16/319, 343, 344

[56] References Cited

U.S. PATENT DOCUMENTS

| | | | |
|---|---|---|---|
| 1,435,110 | 11/1922 | Efford | 248/289.1 |
| 2,721,345 | 6/1955 | Aken | 14/71 |
| 3,275,283 | 9/1966 | Rauch | 248/289.1 |
| 3,747,706 | 7/1973 | Paine et al. | 182/113 |
| 3,912,298 | 6/1975 | Humphrey | 280/166 |
| 3,997,211 | 12/1976 | Graves | 296/23 G |
| 4,074,884 | 2/1978 | Antoszeski | 248/289.1 |
| 4,188,057 | 2/1980 | Pauli | 296/162 |
| 4,293,055 | 10/1981 | Hooser | 182/106 |
| 4,335,862 | 6/1982 | Sherman | 248/289.1 |
| 4,482,284 | 11/1984 | Robbins | 414/539 |
| 4,551,056 | 11/1985 | Risner | 414/539 |
| 4,664,227 | 5/1987 | Hansen | 182/82 |
| 4,718,684 | 1/1988 | Rabatic | 280/20 |
| 4,718,812 | 1/1988 | Smalley et al. | 414/540 |
| 4,720,116 | 1/1988 | Williams et al. | 280/166 |

Primary Examiner—Charles A. Marmor
Assistant Examiner—Eric Culbreth
Attorney, Agent, or Firm—Price, Heneveld, Cooper, DeWitt & Litton

[57] ABSTRACT

A handrail assembly for use on a marine vessel, travel trailer, motor home or other recreational vehicle is pivotally mounted to the side thereof to effect easy adjustment of the handrail between an extended, operative position facilitating access to the vehicle or vessel and a collapsed, storage position avoiding interference during the travel thereof. The handrail includes an elongated rod adjustably mounted to a pair of brackets which permit the swinging collapse of the handrail against the vehicle and also facilitates an effective, easily achieved locking of the handrail in the desired operative and collapsed positions.

7 Claims, 2 Drawing Sheets

HANDRAIL

BACKGROUND OF THE INVENTION

The present invention pertains to handrails, and in particular, to a handrail specially suited for use on a marine vessel, motor home, travel trailer or other recreational vehicle. Many recreational vehicles and vessels provide a series of steps and an associated handrail along their outer surfaces to accommodate easy access thereto. However, due to the mobility of the vehicle or the like, the handrail must be adjustably constructed to avoid interference with the desired travel.

One common approach is to detachably secure the handrail to the vehicle so that it may be removed for travel. An example of such a construction is disclosed in U.S. Pat. No. 4,664,227 issued May 12, 1987 to Hansen, and entitled PORTABLE BALUSTRADE AND PLATFORM ASSEMBLY. However, while such arrangements avoid travel interference, they involve labor-intensive and time-consuming operations to attach and detach, and therefore often become a nuisance to the user. Furthermore, suitable and easily-accessible storage space must be provided for receiving the handrail during travel. Also, the various fasteners utilized to assemble and attach the handrail must be kept track of to ensure that they will not become lost or erroneously used in the subsequent erection and attachment of the handrail. This problem is especially acute if the handrail is to be stored for a long duration before reassembling.

In an effort to alleviate these difficulties, past artisans have also developed collapsible handrails, such as disclosed in: U.S. Pat. No. 4,720,116 issued Jan. 19, 1988 to Williams et al., and entitled STORABLE STAIRWAY AND PLATFORM APPARATUS FOR RECREATIONAL VEHICLES; U.S. Pat. No. 3,997,211 issued Dec. 14, 1976 to Graves, and entitled RETRACTABLE PATIO ASSEMBLY FOR USE ON A PICKUP TRUCK MOUNTED CAMPER OR THE LIKE; and U.S. Pat. No. 3,912,298 issued Oct. 14, 1975 to Humphrey, and entitled FOLDABLE STEPS FOR MOBILE HOME. However, these handrails typically involve a plurality of pivotally interconnected segments which cooperate to effect collapse of the handrail against the vehicle in a vertical plane or elements which fold against an enlarged horizontal porch section before collapsing against the side of the vehicle. These arrangements greatly increase the complexity of the handrail and invariably increase the cost of fabrication and the susceptibility to disrepair.

SUMMARY OF THE INVENTION

In accordance with the present invention, a unique one-piece handrail is pivotally mounted to the side of a recreational vehicle or vessel to effect easy adjustment thereof between the operative and storage positions.

The handrail includes an elongated, specially configured rod having a one-piece, unitary construction. The handrail, in turn, is adjustably mounted to a pair of brackets which permit not only an easy, swinging collapse of the handrail against the vehicle, but also facilitate an effective, easily achieved locking of the handrail in the desired operative and collapsed positions. More specifically, the handrail cooperatively interacts with the unique configuration of the brackets and a spring to achieve the manually releasable securing of the handrail in its operative and storage positions.

Hence, the present handrail assembly provides an easily swingable arrangement which avoids time-consuming assembly and disassembly operations. Moreover, by utilizing an efficient, one-piece, durable construction, a collapsible handrail is provided without the heretofore required complexity. This advantageous feature not only reduces the cost of the system, but also tends to reduce the frequency of needed maintenance and repair.

These and other objects, advantages and features of the present invention will be more fully understood and appreciated by reference to the written specification and appended drawings.

DETAILED DESCRIPTION OF THE PREFERRED EMBODIMENTS

Figure 1:
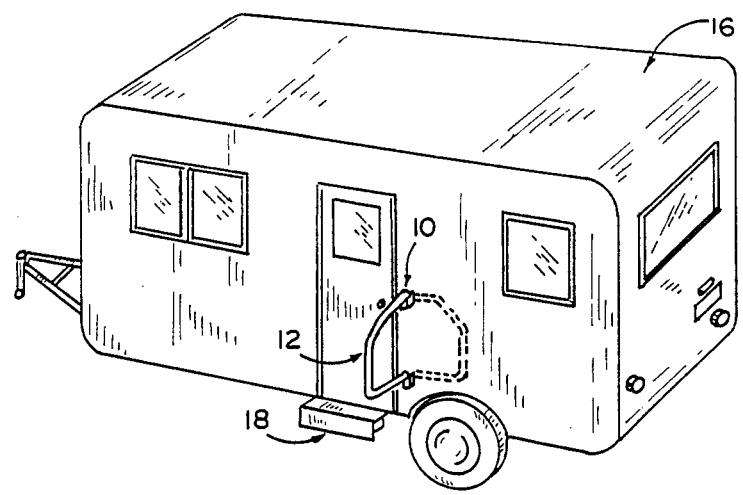
FIG. 1 is a perspective view of a recreational vehicle having a handrail of the present invention, the handrail being depicted by solid lines in its operative position and in phantom in its collapsed position.
Figure 2:
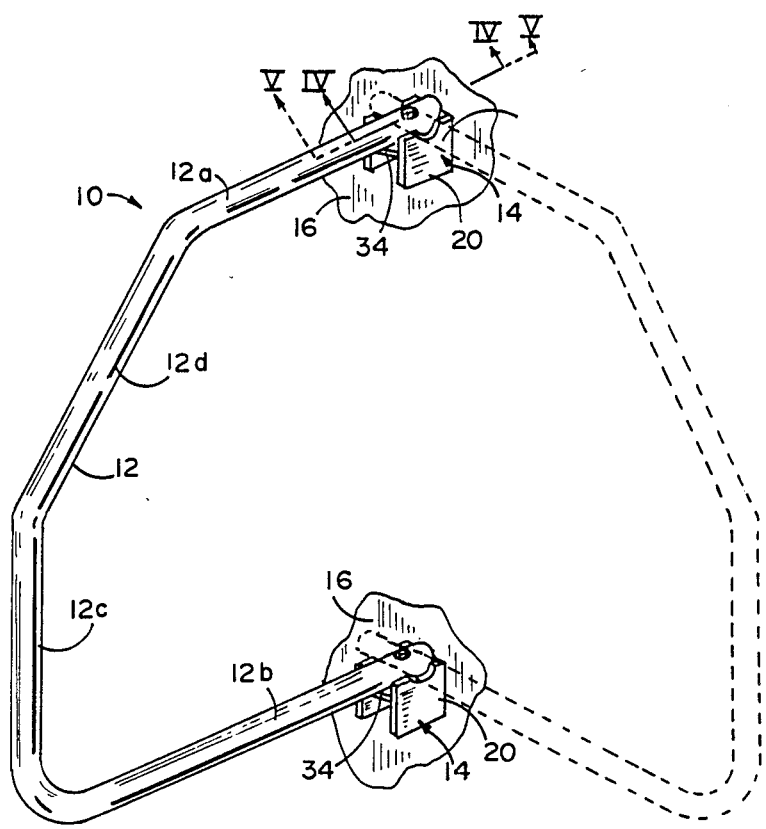
FIG. 2 is an enlarged, perspective view of the handrail assembly, the handrail being depicted by solid lines in its operative position and in phantom in its collapsed position.

Handrail assembly 10 includes an elongated, specially configured rail 12 which is adjustably secured to a pair of spaced apart brackets 14 for movement between an extended, operative position and a collapsed position (FIGS. 1 and 2). Preferably, handrail assembly 10 is utilized in connection with a marine vessel, travel trailer, motor home or other recreational vehicle 16, although it could be used in a variety of other environments. The adjustment capabilities of rail 12 effects easy access to the vehicle or the like 16 when extended (full lines in FIGS. 1 and 2) and avoids interference for traveling when collapsed (phantom lines in FIGS. 1 and 2).

Rail 12 is a one-piece, unitary, tubular member (FIG. 2) having a specially configured, generally U-shape to facilitate convenient and comfortable grasping by an individual traversing the stairway or steps 18 associated with the vehicle 16 (FIG. 1). In the most preferred embodiment, rail 12 includes a pair of horizontal end segments 12a, 12b effecting the attachment to brackets 14, a lower vertical segment 12c and an inclined segment 12d which corresponds to the gradient of stairway 18. Rail 12 is preferably of a tubular galvanized steel construction having a protective coating thereon. Alternatively, though, rail 12 may also be fabricated of aluminum having an anodized surface or any other material having the requisite strength, weather resistance, and lightweight characteristics Brackets 14 are fixedly attached to the side of the vehicle 16 and spaced apart a distance equal to the spacing between end segments 12a, 12b (FIGS. 1 and 2). The brackets are preferably composed of a galvanized steel or aluminum construction, but as with rail 12, they could also be composed of a number of materials having the requisite strength and weather resistance characteristics. Since each of the brackets 14, the associated mounting hardware and the mode of mounting are identical, only one will be described in detail.

Figure 3:
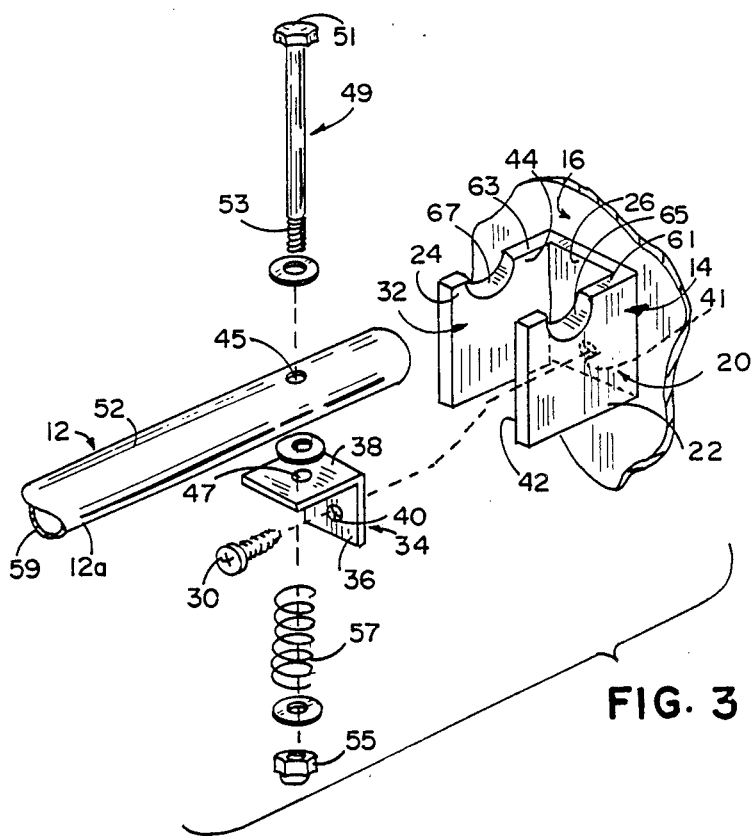
FIG. 3 is a fragmentary, exploded view illustrative of each end of the handrail and its associated bracket and mounting hardware.
Figure 4:
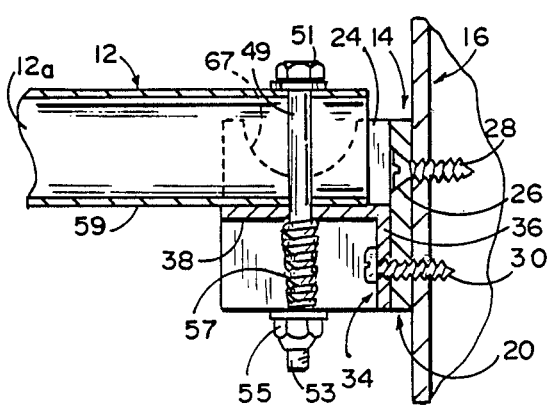
FIG. 4 is a cross-sectional view taken along lines IV—IV in FIG. 2 showing the handrail in operative position.
Figure 5:
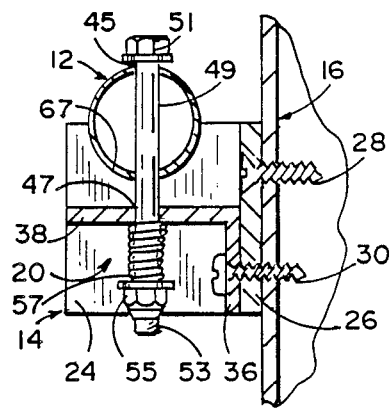
FIG. 5 is a cross-sectional view taken along lines V—V in FIG. 2 showing the handrail in collapsed position.

More specifically, bracket 14 includes a U-shaped body 20 having a pair of outwardly projecting arms 22, 24 defining a central gap 32 and an interconnecting bight 26 which is placed in abutting relation with vehicle 16 to effect the attachment thereto (FIGS. 3-5). The width of gap 32--i.e., the distance between arms 22 and 24 equals or slightly exceeds the diameter of end segments 12a and 12b of rail 12. The upper sections of arms 22 and 24 contain arcuate recesses 65 and 67, respectively, into which the ends 12a and 12b nest when the rail is rotated to its collapsed position The radius of these recesses, preferably, is approximately the same as the radius of ends 12a and 12b.

Preferably, body 20 is fixedly secured in place through the use of a pair of threaded fasteners 28, 30, although many other means such as welding, riveting, etc. could be used. Upper fastener 28 is countersunk within bight 26 to avoid any interference with the rotating of rail 12, as will be discussed below.

Received with gap 32 is an L-shaped flange 34 having a generally vertically oriented base leg 36 and a generally horizontally oriented extended leg 38. Base leg 36 is positioned to abuttingly engage bight 26 to facilitate coupling of flange 34 with body 20. More particularly, base leg 36 includes an aperture 40 which is aligned with bore 41 in bight 26 to receive therethrough lower fastener 30. Lower fastener 30, then, not only secures bracket 14 to vehicle 16, but also acts to secure the bracket itself together by attaching flange 34 to body 20. Flange 34 is further shaped to have a width dimension substantially equal to the width of gap 32 so that the inner surfaces 42, 44 of arms 22, 24 prevent any rotation of flanges 34. Of course, flange 34 could be secured to body 20 by any known means.

To swingably attach rail 12 to bracket 14, corresponding bores 45, 47 provided in end segment 12a (and 12b) and extended leg 38 of bracket flange 34, respectively, are aligned for receiving therethrough a pivot pin 49 (FIGS. 3-5). Pin 49 is preferably in the form of a bolt having a head 51 in abutting relation with the top portion 52 of rail 12 and a threaded portion 53 mounting an opposing nut 55. Head 51 and nut 55 are spaced apart a sufficient distance to permit rail 12 to move vertically relative to bracket 14. A spring 57 is provided between flange 34 and nut 55 to bias rail 12 into its locked positions as will be discussed below. Washers are preferably provided at the locations shown in FIG. 3.

In the extended, operative position (full lines FIGS. 1-3), rail 12 is oriented such that end segments 12a, 12b are matingly received within gaps 32 of arms 22, 24 in an orthogonal relationship with vehicle 16 (FIG. 4). In this arrangement, the lower edges 59 of end segments 12a, 12b are biased by springs 57 into engagement with extended legs 38 of bracket flanges 34. With rail end segments 12a, 12b situated within gaps 32, the inner surfaces 42, 44 of arms 22, 24 engage the sides of the rail 12 and thereby prevent any rotative movement thereof about pivot pin 49, particularly when a downward force is exerted on the rail as is the case when someone is grasping it to facilitate descending or ascending the steps 18. In this way, then, rail 12 is securely held in place as a steady guide upon which the user can depend.

To swing rail 12 to its inoperative, collapsed, storage position, the user manually lifts rail 12 against the bias of springs 57 until its bottom edge 59 has cleared the upper edges 61, 63 of arms 22, 24. As discussed above, nut 55 is spaced sufficiently away from head 51 (and flange 34 in its operative position) to permit such vertical movement. With the necessary clearance now achieved, rail 12 may be arcuately swung toward the side of the vehicle 16 until it assumes a position adjacent thereto, as shown in phantom lines in FIGS. 1-3. Once it has been moved to this position, the forces of springs 57 and gravity lower rail 12 until end segments 12a, 12b are matingly received by arcuate recesses 65, 67 positioned in alignment along upper edges 61, 63 of arms 22, 24 (FIG. 5). As can be readily appreciated, recesses 65, 67, in cooperation with the downward bias of spring 57, prevent any rotative movements of rail 12 from occurring during traveling or at other times when rail 12 is in its collapsed position. To move rail 12 once again to its operative position, the user simply reverses the above discussed steps. Thus, these brackets and the cooperative rail portions serve as means for enabling the rail to be selectively swingably shifted into the first operative position or the second storage position, permitting the rail to be swung into and retained at the first position, or into and retained at the second position.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows.

1. A handrail for use on vehicles, said handrail comprising:
   a generally U-shaped rail having upper and lower end segments;
   means for swingably attaching said rail at said upper and lower end segments to the side of said vehicle adjacent an entry-exit point;
   first means for retaining said rail in a first, operative position which is generally perpendicular to the side of said vehicle so that said rail may be grasped by the user to facilitate entry and exit;
   second means for retaining said rail in a second, collapsed, storage position generally parallel to the side of said vehicle to avoid interference in situations such as during travel of said vehicle;
   means for enabling said rail to be selectively swingably shifted into said first operative position or said second storage position, permitting said rail to be swung into and retained at said first position or into and retained at said second position;
   said first means for retaining said rail in said first, operative position comprising brackets, each of said brackets having a vertical gap, said upper and lower end segments of said rail fitting into said gaps to prevent any substantial inadvertent pivoting of said rail when in its first, operative position;
   said rail being movable between said first, operative position and said second, storage position by vertically lifting said rail out of said gaps and swinging it horizontally about a substantially vertical pivot axis;
   said brackets comprising substantially identical upper and lower brackets, said gap of said upper bracket receiving a portion of said upper end segment and said gap of said lower bracket receiving a portion of said lower end segment when said rail is placed into said operative position, an upper bracket recess receiving a portion of said upper end segment and a lower bracket recess receiving a portion of said lower end segment when said rail is placed into said collapsed position;

each of said upper and lower brackets including a generally horizontally extending flange positioned within said gap upon which said upper and lower end segments rest when said rail is in said operative position.

2. The handrail assembly of claim 1 further comprising upper and lower vertical pivot pins passing through the upper and lower end segments of said rail and into the flanges of said upper and lower brackets.

3. The handrail assembly of claim 2 further including a biasing means for releasably biasing said rail into said gap when said rail is in said operative position and for releasably biasing said rail into said at least one recess when said rail is in said collapsed position, whereby said lifting of said rail during the adjustment thereof is against said biasing means and acts to remove said rail from either one of said gap and said recess.

4. A handrail for use on vehicles, said handrail comprising:

a generally U-shaped rail having upper and lower end segments;

means for swingably attaching said rail at said upper and lower end segments to the side of said vehicle adjacent an entry-exit point;

said attaching means including at least one bracket and in which said at least one bracket includes a pair of outwardly projecting arms defining a vertical gap therebetween which receives said rail therein when said rail is in said extended operative position;

first means for retaining said rail in a first, operative position which is generally perpendicular to the side of said vehicle so that said rail may be grasped by the user to facilitate entry and exit;

second means for retaining said rail in a second, collapsed, storage position generally parallel to the side of said vehicle to avoid interference in situations such as during travel of said vehicle;

means for enabling said rail to be selectively swingably shifted into said first operative position or said second storage position, permitting said rail to be swung into and retained at said first position or into and retained at said second position;

said first means for retaining said rail in said first operative position comprising brackets, each of said brackets having a vertical gap, said upper and lower end segments of said rail fitting into said gaps to prevent any substantial inadvertent pivoting of said rail when in its first, operative position;

said rail being movable between said first, operative position and said second, storage position by vertically lifting said rail out of said gaps and swinging it horizontally about a substantially vertical pivot axis;

said brackets further including a generally horizontally extending flange positioned within said gap, in which said substantially vertical pivot axis is defined by a pivot pin received through aligned apertures in said rail and said flange, and in which said handrail assembly further includes a biasing means for resiliently biasing said rail against said flange when said rail is in said operative position, so that said rail is releasably maintained in said gap to avoid inadvertent pivoting of said rail.

5. The handrail assembly of claim 4 in which each of said bracket have arms including an upper edge having a recess to receive said rail when said rail is in said collapsed position to prevent said rail from any substantial inadvertent swinging motion.

6. The handrail assembly of claim 5 in which said biasing means further acts to bias said handrail into said recesses when said rail is in said collapsed position, so that said rail is releasably maintained in said recesses to avoid inadvertent pivoting of said rail.

7. The handrail assembly of claim 6 wherein each of said end segments is adjustably secured to the side of the vehicle.

* * * * *